(12) United States Patent
Zhang et al.

(10) Patent No.: US 11,850,970 B2
(45) Date of Patent: Dec. 26, 2023

(54) J-TYPE AIR-COOLED BATTERY THERMAL MANAGEMENT SYSTEM AND METHOD

(71) Applicant: Board of Regents, The University of Texas System, Austin, TX (US)

(72) Inventors: Jie Zhang, Allen, TX (US); Yuanzhi Liu, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 410 days.

(21) Appl. No.: 16/996,475

(22) Filed: Aug. 18, 2020

(65) Prior Publication Data

US 2021/0046849 A1 Feb. 18, 2021

Related U.S. Application Data

(60) Provisional application No. 62/888,510, filed on Aug. 18, 2019.

(51) Int. Cl.
*B60L 58/26* (2019.01)
*B60K 1/00* (2006.01)
(Continued)

(52) U.S. Cl.
CPC .......... *B60L 58/26* (2019.02); *B60K 1/00* (2013.01); *B60K 1/04* (2013.01); *B60L 50/64* (2019.02);
(Continued)

(58) Field of Classification Search
CPC .......... B60L 58/26; B60L 58/00; B60L 58/24; B60L 58/10; B60L 50/64; B60L 50/00;
(Continued)

(56) References Cited

U.S. PATENT DOCUMENTS

| | | | | |
|---|---|---|---|---|
| 4,468,440 A | * | 8/1984 | Evjen ................ | H01M 10/613 429/8 |
| 5,560,999 A | * | 10/1996 | Pedicini ............ | H01M 10/633 429/444 |

(Continued)

OTHER PUBLICATIONS

Putra, N., et al., "Experimental investigation on performance of lithium-ion battery thermal management system using flat plate loop heat pipe for electric vehicle application," Applied Thermal Engineering 99, Feb. 4, 2016, 6 pages, Elsevier Ltd.

(Continued)

*Primary Examiner* — James M Dolak

(57) ABSTRACT

Provided, in one aspect, is a battery pack. The battery pack, in accordance with this aspect, includes an enclosure. The battery pack, in accordance with this aspect, further includes an intake port attached to a first section of the enclosure, the intake port coupleable to a source of cooling fluid, a first exhaust port attached to a third section of the enclosure and a second exhaust port coupled to a fourth section of the enclosure. The battery pack of this aspect further includes a first set of battery cells located within the enclosure in the first and third sections, the first set of battery cells separated by one or more first fluid passageways and a second set of battery cells located within the enclosure in a second and the fourth sections, the second set of battery cells separated by one or more second fluid passageways.

9 Claims, 6 Drawing Sheets

(51) Int. Cl.
*B60K 1/04* (2019.01)
*B60L 50/64* (2019.01)
*H01M 10/625* (2014.01)
*H01M 10/6568* (2014.01)
*H01M 10/63* (2014.01)
*H01M 10/613* (2014.01)

(52) U.S. Cl.
CPC ....... *H01M 10/613* (2015.04); *H01M 10/625* (2015.04); *H01M 10/63* (2015.04); *H01M 10/6568* (2015.04); *H01M 2220/20* (2013.01)

(58) Field of Classification Search
CPC .......... B60L 50/50; B60L 50/60; B60L 50/66; B60L 2240/54; B60L 2240/545; B60K 1/04; B60K 1/00; B60K 2001/005; B60K 11/00; B60K 11/02; B60K 11/06; H01M 10/60; H01M 10/61; H01M 10/625; H01M 10/6568; H01M 10/63; H01M 10/613; H01M 10/486; H01M 10/635; H01M 10/6563; H01M 10/48; H01M 2220/20
See application file for complete search history.

(56) References Cited

U.S. PATENT DOCUMENTS

| | | | | |
|---|---|---|---|---|
| 5,639,571 A * | 6/1997 | Waters | H01M 10/6563 | 180/68.5 |
| 6,569,556 B2 * | 5/2003 | Zhou | H01M 10/6565 | 429/88 |
| 7,045,236 B1 * | 5/2006 | Andrew | H01M 10/613 | 429/83 |
| 7,230,404 B2 * | 6/2007 | Kimoto | H01M 10/658 | 320/150 |
| 7,892,671 B2 * | 2/2011 | Hamery | H01M 10/6557 | 180/68.5 |
| 8,187,736 B2 * | 5/2012 | Park | H01M 10/633 | 903/952 |
| 8,251,169 B2 * | 8/2012 | Fujiwara | H01M 10/6565 | 180/68.5 |
| 8,276,696 B2 * | 10/2012 | Lucas | B60K 1/04 | 180/68.5 |
| 8,329,330 B2 * | 12/2012 | Okada | H01M 10/617 | 429/152 |
| 8,435,664 B2 * | 5/2013 | Saito | H01M 50/209 | 429/72 |
| 8,820,455 B2 * | 9/2014 | Nitawaki | B60L 50/64 | 180/68.5 |
| 9,425,628 B2 * | 8/2016 | Pham | B60L 58/26 | |
| 9,564,667 B2 * | 2/2017 | Iwasa | H01M 10/6563 | |
| 9,566,859 B2 * | 2/2017 | Hatta | B60L 50/64 | |
| 9,673,492 B2 * | 6/2017 | Nemesh | H01M 10/625 | |
| 9,899,712 B2 * | 2/2018 | Nagano | B60L 50/64 | |
| 9,979,056 B2 * | 5/2018 | Maguire | H01M 10/625 | |
| 9,985,325 B2 * | 5/2018 | Maguire | H01M 10/625 | |
| 9,991,574 B2 * | 6/2018 | Nakagawa | H01M 10/6557 | |
| 10,106,025 B2 * | 10/2018 | Wang | B60K 6/405 | |
| 10,109,894 B2 * | 10/2018 | Tsujimura | B60K 1/04 | |
| 10,343,548 B2 * | 7/2019 | Yokoyama | B60L 50/66 | |
| 10,358,046 B2 * | 7/2019 | Myers | B60H 1/00 | |
| 10,427,538 B2 * | 10/2019 | Myers | F25B 9/04 | |
| 10,707,545 B2 * | 7/2020 | Kim | H01M 10/6563 | |
| 11,108,101 B2 * | 8/2021 | Kosteva | H01M 50/204 | |
| 11,635,261 B2 * | 4/2023 | Hall | B60H 1/08 | 165/165 |
| 11,685,292 B2 * | 6/2023 | Amarasinghe | B60K 11/04 | 165/80.2 |
| 11,688,903 B2 * | 6/2023 | Porras | H01M 10/6569 | 62/118 |
| 11,695,174 B2 * | 7/2023 | Mummigatti | H01M 10/6555 | 429/120 |
| 11,705,603 B2 * | 7/2023 | Gondoh | H01M 50/249 | 429/56 |
| 2009/0071178 A1 * | 3/2009 | Major | B60L 58/27 | 62/239 |
| 2011/0020676 A1 * | 1/2011 | Kurosawa | H01M 10/653 | 429/62 |
| 2013/0228387 A1 * | 9/2013 | Lucas | H01M 10/625 | 429/120 |

OTHER PUBLICATIONS

Qu, Z.G., et al., "Numerical model of the passive thermal management system for high-power lithium ion battery by using porous metal foam saturated with phase change material," Science Direct, International Journal of Hydrogen Energy 39, Jan. 31, 2014, 10 pages, Elsevier Ltd.

Qudeiri, J. E. A., et al., "Response Surface Metamodel to Predict Springback in Sheet Metal Air Bending Process," International Journal of Materials, Mechanics and Manufacturing, vol. 3, No. 4, Nov. 2015, 5 pages.

Ramadass, P., et al., "Capacity fade of Sony 18650 cells cycled at elevated temperatures Part I. Cycling performance," Journal of Power Sources 112, Aug. 2002, 8 pages, Elsevier Ltd.

Rao, L., et al., "Heat-Generation Rate and General Energy Balance for Insertion Battery Systems," Journal of the Electrochemical Society, vol. 144, No. 8, Aug. 1997, 9 pages.

Rao, Z., et al., "Investigation of the thermal performance of phase change material/mini-channel coupled battery thermal management system," Applied Energ 164, 2016, 11 pages, Elsevier Ltd.

Saw, L. H., et al., "Novel thermal management system using mist cooling for lithium-ion battery packs," Applied Energy 223, 2018, 13 pages, Elsevier Ltd.

Saxen, H., et al., "Data-Driven Time Discrete Models for Dynamic Prediction of the Hot Metal Silicon Content in the Blast Furnace-A Review," IEEE Transactions on Industrial Informatics, vol. 9, No. 4, Nov. 2013, 13 pages.

Shahid, S., et al., "Analysis of Cooling Effectiveness and Temperature Uniformity in a Battery Pack for Cylindrical Batteries," Energies, Aug. 7, 2017, MDPI, www.mdpi.com/journal/energies, 17 pages.

Song, X., et al., "An Advanced and Robust Ensemble Surrogate Model: Extended Adaptive Hybrid Functions," Journal of Mechanical Design, Apr. 2018, vol. 140, 9 pages.

Tao, X., et al., "A thermal management system for the battery pack of a hybrid electric vehicle: modeling and control," Institution of Mechanical Engineers, Proc /MechE Part D:Journal of Automobile Engineering 2016, vol. 230(2), 12 pages.

Vatanparvar, K., et al., "OTEM: Optimized Thermal and Energy Management for Hybrid Electrical Energy Storage in Electric Vehicles," 2016 Design, Automation & Test in Europe Conference & Exhibition, 6 pages.

Wang, H., et al., "Experimental and modeling study of controller-based thermal management of battery modules under dynamic loads," International Journal of Heat and Mass Transfer 103, 2016, 11 pages, Elsevier Ltd.

Wang, C., et al., "Liquid cooling based on thermal silica plate for battery thermal management system," International Journal of Wiley Energy Research, Jun. 8, 2017, 12 pages, John Wiley & Sons, Ltd.

Wang, J., et al., "Pressure drop and flow distribution in parallel-channel configurations of fuel cells: Z-type arrangement," Science Direct, International Journal of Hydrogen Energy 35, 2010, 12 pages, Elsevier Ltd.

Wang, T., et al., "Thermal investigation of lithium-ion battery module with different cell arrangement structures and forced air-cooling strategies," Applied Energy 134, 2014, 10 pages, Elsevier Ltd.

Wang, X., et al., "Surrogate based multidisciplinary design optimization of lithium-ion battery thermal management system in electric vehicles," Surrogate based MDO of Lithium-ion BTMS in EVs, Jun. 20, 2017, 16 pages, Springer.

(56) References Cited

OTHER PUBLICATIONS

Xia, G., et al., "A review on battery thermal management in electric vehicle application," Journal of Power Sources 367, 2017, 16 pages, Elsevier Ltd.

Xun, J., et al., "Numerical and analytical modeling of lithium ion battery thermal behaviors with different cooling designs," Journal of Power Sources 233, 2013, 15 pages, Elsevier Ltd.

Yang, N., et al., "Assessment of the forced air-cooling performance for cylindrical lithium-ion battery packs: A comparative analysis between aligned and staggered cell arrangements," Applied Thermal Engineering 80, 2015, 11 pages, Elsevier Ltd.

Yang, Z., et al., "Electrothermal Modeling of Lithium-Ion Batteries for Electric Vehicles," IEEE Transactions on Vehicular Technology, vol. 68, No. 1, Jan. 2019, 10 pages.

Yang, Z., et al., "Online Estimation of Capacity Fade and Power Fade of Lithium-Ion Batteries Based on Input-Output Response Technique," IEEE Transactions on Transportation Electrification, vol. 4, No. 1, Mar. 2018, 10 pages.

Zhao, R., et al., "An experimental study of heat pipe thermal management system with wet cooling method for lithium ion batteries," Journal of Power Sources 273, 2015, 9 pages, Elsevier Ltd.

Zhao, X., et al., "Modeling of battery dynamics and hysteresis for power delivery prediction and SOC estimation," Applied Energy 180, 2016, 11 pages, Elsevier Ltd.

Zhao, R., et al., "The effects of electrode thickness on the electrochemical and thermal characteristics of lithium ion battery," Applied Energy 139, 2015, 10 pages, Elsevier Ltd.

Liu, Y., et al., "Self-adapting J-type air based battery thermal management system via model predictive control," Applied Energy 263, 2020, 11 pages, Elsevier Ltd.

Pesaran, A., et al., "Addressing the Impact of Temperature Extremes on Large Format Li-Ion Batteries for Vehicle Applications," National Renewable Energy Laboratory, 30th International Battery Seminar, Mar. 11-14, 2013, 30 pages.

Afram, A., et al., "Theory and applications of HVAC control systems—A review of model predictive control (MPC)," Department of Mechanical and Industrial Engineering, Building and Environment, Nov. 18, 2013, 13 pages.

Alfi, A., et al., "Hybrid state of charge estimation for lithium-ion batteries: design and implementation," The Institution of Engineering and Technology 2014, IET Power Electronics, vol. 7, Issue 11, 7 pages.

Bandhauer, T. M., et al., "Temperature-dependent electrochemical heat generation in a commercial lithium-ion battery," Journal of Power Sources, 2013 Elsevier, 11 pages.

Bassiouny, M. K., et al., "Flow Distribution and Pressure Drop In Plate Heat Exchangers-I," Chemical Engineering Science vol. 39, No. 4, 1984, 8 pages.

Basu, S., et al., "Coupled Electrochemical Thermal Modelling of a Novel Li-ion Battery Pack Thermal Management System," Applied Energy 2016, Elsevier Ltd., 13 pages.

Blatman, G., et al., "Adaptive sparse polynomial chaos expansion based on least angle regression," Journal of Computational Physics 2010, Elsevier Inc., 23 pages.

Brunton, S. L., et al., "Discovering governing equations from data by sparse identification of nonlinear dynamical systems," PNAS Early Edition 2016, 6 pages.

Burban, G., et al., "Experimental investigation of a pulsating heat pipe for hybrid vehicle applications," Applied Thermal Engineering 2012, Elsevier Ltd., 10 pages.

Chen, K., et al., "Structure optimization of parallel air-cooled battery thermal management system," International Journal of Heat and Mass Transfer 2017, Elsevier Ltd., 10 pages.

Chen, P-W, et al. "Model Selection of SVMs Using GA Approach," IEEE, 2004, pp. 2035-2040.

Cheng, X-B, et al., "Toward Safe Lithium Metal Anode in Rechargeable Batteries: A Review," Chemical Reviews, 2017 American Chemical Society, pp. 10403-10473, ACS Publications.

Chowdhury, S., et al., "Optimal Metamodeling To Interpret Activity-Based Health Sensor Data," Proceedings of the ASME 2017 International Design Engineering Technical Conference and Computers and Information in Engineering Conference, Aug. 6-9, 2017, DETC2017-68385, 11 pages.

Cui, M., et al., "Estimating ramping requirements with solar-friendly flexible ramping product in multi-timescale power system operations," Applied Energy 2018, Elsevier Ltd., 15 pages.

Dai, H., et al., "Online cell SOC estimation of Li-ion battery packs using a dual time-scale Kalman filtering for EV applications," Applied Energy, 2012, Elsevier Ltd., 11 pages.

Dong, G., et al., "Online state of charge estimation and open circuit voltage hysteresis modeling of LiFePO4 battery using invariant imbedding method," Applied Energy 2015, Elsevier Ltd., 9 pages.

Duan, X., et al., "Heat transfer in phase change materials for thermal management of electric vehicle battery modules," International Journal of Heat and Mass Transfer 2015, Elsevier Ltd., 7 pages.

Fernandez, V. M. G., et al., "Thermal Analysis of a Fast Charging Technique for a High Power Lithium-Ion Cell," Batteries 2016, www.mdpi.com/journal/batteries, 9 pages.

Gao, X., et al., "Active Thermal Control of a Battery Pack Under Elevated Temperatures," ScienceDirect 2018, Elsevier Ltd., 6 pages, www.sciencedirect.com.

Ghassemi, P., et al., "Optimal Surrogate and Neural Network Modeling for Day-Ahead Forecasting of the Hourly Energy Consumption of University Buildings," Proceedings of the ASME 2017 International Design Engineering Technical Conferences and Computers and Information in Engineering Conference, Aug. 6-9, 2017, DETC2017-68350, 19 pages.

Goel, T., et al., "Comparing three error criteria for selecting radial basis function network topology," Comput. Methods Appl. Mech. Engrg. 2009, Elsevier Ltd., 14 pages.

Gorissen, D., et al., "Evolutionary Model Type Selection for Global Surrogate Modeling," Journal of Machine Learning Research, 2009, 40 pages.

Greco, A., et al., "A Theoretical and computational study of lithium-ion battery thermal management for electric vehicles using heat pipes," Journal of Power Sources 2014, Elsevier Ltd., 12 pages.

Hardy, R. L., et al., "Multiquadric Equations of Topography and Other Irregular Surfaces," Journal of Geophysical Research, Mar. 10, 1971, vol. 76, No. 8, 11 pages.

Hayes, J. G., et al., "Simplified Electric Vehicle Powertrain Model for Range and Energy Consumption based on EPA Coast-down Parameters and Test Validation by Argonne National Lab Data on the Nissan Leaf," 2014, IEEE, 6 pages.

He, H., et al., "Online estimation of model parameters and state-of-charge of LiFePO4 batteries in electric vehicles," Applied Energy 2011, 8 pages, Elsevier, Ltd.

He, F., et al., "Thermal management of batteries employing active temperature control and reciprocating cooling flow," International Journal of Heat and Mass Transfer, 2015, 9 pages, Elsevier, Ltd.

Holena, M., et al., "Assessing the suitability of surrogate models in evolutionary optimization," Institute of Computer Science, Academy of Sciences of the Czech Republic, 2011, 8 pages, http://citeseerx.ist.psu.edu/viewdoc/download?doi=10.1.1.360.7096&rep=rep1&type=pdf.

Hunt, I. A., et al., "Surface Cooling Causes Accelerated Degradation Compared to Tab Cooling for Lithium-Ion Pouch Cells," Journal of The Electrochemical Society, Jul. 1, 2016, 7 pages.

Huo, Y., et al., "Investigation of power battery thermal management by using mini-channel cold plate," Energy Conversion and Management, 2016, 11 pages, Elsevier, Ltd.

Jin, R., et al., "Comparative studies of metamodelling techniques under multiple modelling criteria," Struct Multidisc Optim, Dec. 2001, 13 pages, Springer.

Jin, L. W., et al., "Ultra-thin minichannel LCP for EV battery thermal management," Applied Energy, 9 pages, 2014, Elsevier, Ltd.

Khateeb, S. A., "Design and simulation of a lithium-ion battery with a phase change material thermal management system for an electric scooter," Journal of Power Sources, 2004, 16 pages, Elsevier, Ltd.

(56) References Cited

OTHER PUBLICATIONS

Kim, J., et al. "Review on battery thermal management system for electric vehicles," Applied Thermal Engineering 149, Dec. 4, 2018, 21 pages, Elsevier Ltd.

Lazrak, A., et al., "An innovative practical battery thermal management system based on phase change materials: Numerical and experimental investigations," Applied Thermal Engineering, 2018, 13 pages, Elsevier, Ltd.

Li, Y. F., et al., "A systematic comparison of metamodeling techniques for simulation optimization in Decision Support Systems," Applied Soft Computing, 2010, 17 pages, Elsevier, Ltd.

Ling, Z., et al., "Experimental and numerical investigation of the application of phase change materials in a simulative power batteries thermal management system," Applied Energy, 2014, 10 pages, Elsevier, Ltd.

Ling, Z., et al., "Review on thermal management systems using phase change materials for electronic components, Li-ion batteries and photovoltaic modules," Renewable and Sustainable Energy Reviews, 2014, 12 pages, Elsevier, Ltd.

Liu, Y., et al., "An Experimental Parametric Study of Air-Based Battery Thermal Management System for Electric Vehicles," Proceedings of the ASME 2017 International Design Engineering Technical Conferences and Computers and Information in Engineering Conference, Aug. 6-9, 2017, DETC2017-67841, 8 pages.

Liu, Y., et al., "Surrogate Based Multi-Objective Optimization of J-Type Battery Thermal Management System," Proceedings of the ASME 2018 International Design Engineering Technical Conferences and Computers and Information in Engineering Conference, Aug. 26-29, 2018, DETC2018-85620, 9 pages.

Liu, Y., et al., "Design a J-Type air-based battery thermal management system through surrogate-based optimization," Applied Energy, 2019, 13 pages, Elsevier, Ltd.

Lu, L., et al., "A review on the key issues for lithium-ion battery management in electric vehicles," Journal of Power Sources, 2013, 17 pages, Elsevier, Ltd.

Mahamud, R., et al., "Reciprocating air flow for Li-ion battery thermal management to improve temperature uniformity," Journal of Power Sources, 2011, 12 pages, Elsevier, Ltd.

Marongiu, A., et al., "Comprehensive study of the influence of aging on the hysteresis behavior of a lithium iron phosphate cathode-based lithium ion battery-An experimental investigation of the hysteresis," Applied Energy, 2016, 17 pages, Elsevier, Ltd.

Martin, J. D., et al., "A study on the use of Kriging Models to Approximate Deterministic Computer Models," Proceedings of DETC'03 ASME 2003 Design Engineering Technical Conferences and Computers and Information in Engineering Conference, Sep. 2-6, 2003, DETC2003/DAC-48762, 10 pages.

Masoudi, Y., et al., "MPC-based Battery Thermal Management Controller for Plug-in Hybrid Electric Vehicles," 2017 American Control Conference, May 24-26, 2017, 6 pages.

Mehmani, A., et al., "Predictive quantification of surrogate model fidelity based on modal variations with sample density," Struct Multidisc Optim, Research Paper, May 14, 2015, 21 pages, Springer.

Mehmani, A., et al., "Concurrent surrogate model selection (COSMOS): optimizing model type, kernel function, and hyper-parameters," Struct Multidisc Optim, Research Paper, 2017, 22 pages, Springer.

Omar, N., et al., "Lithium iron phosphate based battery—Assessment of the aging parameters and developtment of cycle life model," Applied Energy, 2014, 11 pages, Elsevier, Ltd.

Panchal, S., et al., "Thermal design and simulation of mini-channel cold plate for water cooled large sized prismatic-lithium-ion battery," Applied Thermal Engineering, 2017, 11 pages, Elsevier, Ltd.

Park, C., et al., "Dynamic Thermal Model of Li-Ion Battery for Predictive Behavior in Hybrid and Fuel Cell Vehicles," Future Transportation Technology Conference, SAE International, Jun. 23-25, 2003, 10 pages.

\* cited by examiner

J-TYPE AIR-COOLED BATTERY THERMAL MANAGEMENT SYSTEM AND METHOD

CROSS-REFERENCE TO RELATED APPLICATION

This application claims the benefit of U.S. Provisional Application Ser. No. 62/888,510, filed on Aug. 18, 2020, entitled "Air-cooled Battery Thermal Management System and Method," commonly assigned with this application and incorporated herein by reference in its entirety.

FIELD OF THE DISCLOSURE

This disclosure relates to concepts for thermal management design, a battery thermal management system for uniform cooling of a battery pack, and an associated battery pack, all which may be used for example in an electric vehicle.

BACKGROUND

Electric vehicles are likely to flourish in the near future after a rapid development in the past decade. Several major automobile manufacturers have added electric vehicles into their portfolio, for example in response to the growing movements to cut down vehicle emissions. As one of the only power sources for electric vehicles, traction battery technology has progressed from low energy density (e.g., lead-acid, nickel-cadmium, nickel-zinc, and nickel metal hydride battery) to high energy density (e.g., lithium-ion battery). The emergence and use of lithium-ion batteries has prompted the rapid development of electric vehicles, to a great extent due to their high energy density, low self-charging, and low maintenance.

Due to the intrinsic properties of lithium-based electrode materials, the operating temperature is known to have a significant impact on lithium-ion batteries in terms of safety, degradation, and performance. The optimum operating temperature is suggested to be strictly controlled within a narrow range, e.g., 15-35° C., 25-45° C., and 20-45° C. It has been found that an extremely low temperature tends to increase the internal resistance and lead to capacity deficiencies, while an extremely high temperature may accelerate the electrode degradation and capacity reduction, or even lead to safety issues such as fire and explosion. A new battery pack and/or battery thermal management system is thus necessary to maintain the battery thermal surroundings, thereby preventing potential safety risks.

BRIEF DESCRIPTION OF THE DRAWINGS

The subject matter, which is regarded as the disclosure, is particularly pointed out and distinctly claimed in the claims at the conclusion of the specification. The foregoing and other objects, features, and advantages of the disclosure are apparent from the following detailed description taken in conjunction with the accompanying drawings in which:

DETAILED DESCRIPTION

Figure 1:
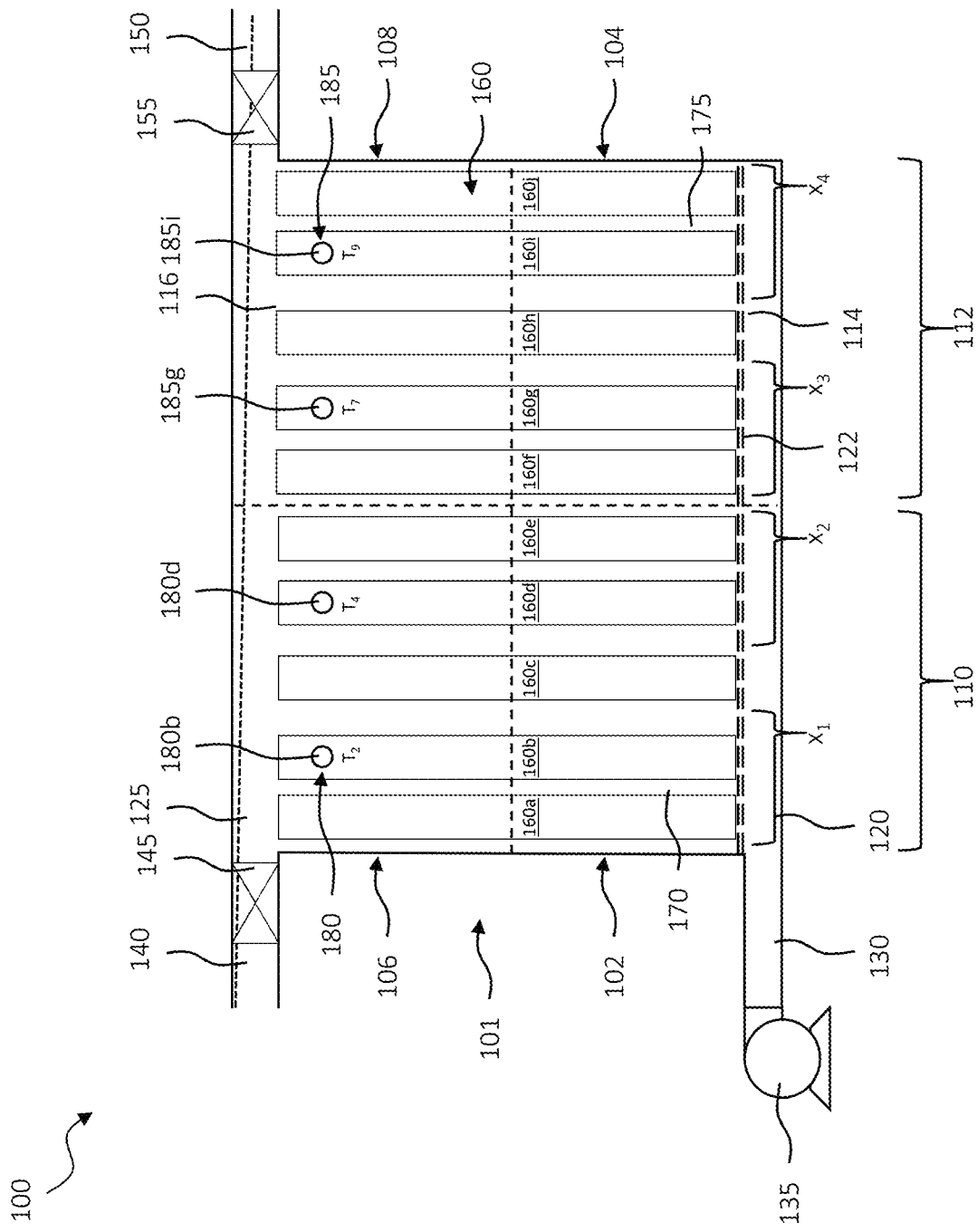
FIG. 1 is a diagram of a battery pack that comprises a J-type fluid-base battery thermal management system in accordance with an embodiment of the present disclosure.

A significant amount of work has been performed on the design and evaluation of advanced battery thermal systems. Most of the work has focused on the cooling aspect, existing technologies including active liquid cooling, active air cooling, heat pipe, phase change material (PCM), and hybrid approaches of those technologies. The focus on battery thermal management systems in the electric vehicle industry differs across the distinctions of lithium-ion battery specifications. Air and fluid cooling technologies have traditionally been successfully applied in the electric vehicle industry.

Compared with other thermal management systems, air-based battery thermal management systems have been widely employed in electric vehicles due to their remarkable lightweight, simple structure, and low cost. Most of the compact size electric vehicles only have passive air-cooling as a trade-off between vehicle weight and cruising capacity. Plug-in hybrid electric vehicles powered by lithium iron phosphate batteries do as well, but with more stable thermal characteristics. For example, the Nissan Leaf and the BYD Song have successfully upgraded for several generations, and the passive cooling systems have been proven to be reliable. Plug-in hybrid electric vehicles with lithium nickel manganese cobalt oxide batteries, like the Toyota Prius, normally employ a fan-driven active air-cooling system, since lithium nickel manganese cobalt oxide batteries are more temperature sensitive than lithium iron phosphate batteries.

However, these applications also reveal the inadequacy of air-based battery thermal management systems, like non-uniform and limited heat dissipation capability, contamination from external cooling air, and potential noise or vibration. The majority of the air-based battery thermal management systems focus on structural design improvement and flow optimization, and attempting to make uniform the internal temperature profile of the battery pack. Furthermore, the flow efficiency and thermal performance of air-based battery thermal management systems can be optimized simultaneously with respect to the existing flow field, e.g., the channel interspacing size and the plenum configuration.

The air-based cooling technologies discussed above have already been proven to have the capability of well controlling the battery temperature in an appropriate range. Compared with the hybrid air-based battery thermal management systems, pure air-cooling has incomparable advantages in terms of stability, maintenance, and vehicle power-to-weight ratio. Existing air-cooling systems attempt to modify the configurations of the channel and plenum to make uniform the air flow rate with a lower pressure drop so as to enhance the temperature uniformity and energy efficiency simultaneously. However, it is challenging to achieve these goals with the conventional U-type or Z-type battery thermal management systems with a fixed structure, particularly under changing working conditions (e.g., discharging, charging, extreme fast charging, etc.), and especially for large battery packs.

To address the challenges presented, this disclosure proposes a flexible battery pack, which is referred to as J-type, and an associated battery thermal management system. Whereas U-type and Z-type battery packs have a single fluid outlet, the J-type battery pack has two outlets, optionally with two control valves, which add more cooling flexibility to the battery pack under ever changing battery working conditions. By controlling the mass flow rate (e.g., opening degree) of the two control valves separately and/or simultaneously, the J-type battery pack can be adaptively controlled (e.g., in real-time) to modify the flow field to provide an optimal cooling strategy to the whole battery pack.

A comparative parametric study among U-type, Z-type, and J-type structures was performed to explore the sensitivities and effects of certain key system parameters, e.g., channel size, plenum configuration, charging/discharging rate, temperature, and cooling fluid flow rate. Based on the parametric analyses, a non-limiting suite of key design parameters and constraints has been determined for optimization of the J-type structure, according to one or more embodiments of the disclosure. The grouped-channel optimizations of the three structures are performed using surrogate-based optimization. The pros and cons of the novel J-type structure are elaborated by comparing it with optimal U-type and Z-type structures. J-type optimization of the plenum configuration has also been conducted to show that the settings of a battery pack vary with battery working conditions, and the J-type battery pack is capable of switching battery thermal management system modes by adjusting the control valves and fluid flow rate (e.g., in real-time) to satisfy the cooling requirement. This disclosure serves to develop a basic design concept of the J-type structure and to establish a pioneering foundation for further battery thermal management system control or co-design framework.

An illustrative example of a battery pack 100 for a J-type battery thermal management system is shown in FIG. 1 in accordance with an embodiment of the present disclosure. The battery pack 100, in the illustrated embodiment, includes an enclosure 101. In accordance with one embodiment, the enclosure 101 is separated into a first section 102, a second section 104, a third section 106, and a fourth section 108. As shown in the embodiment of FIG. 1, the first section 102 is adjacent to each of the second section 104 and the third section 106, and diagonally opposite the fourth section 108. Similarly, the third section 106 is adjacent to each of the first section 102 and the fourth section 108, and diagonally opposite the second section 104. In the illustrated embodiment, the first section 102 is a first lower section, the second section 104 is a second lower section, the third section 106 is a first upper section and the fourth section 108 is a second upper section. It should be noted however, that the terms lower and upper, as well as left and right, as used herein, unless otherwise stated are only intended to positionally relate features to one another in one known configuration. Accordingly, embodiments may exist where the battery pack 100 is rotated such that items that were originally discussed as lower or left, would actually be upper or right, and vice versa. The enclosure 101 of FIG. 1 is additionally separated into a first unit 110 (e.g., left unit) and a second unit 112 (e.g., right unit), the first unit 110 including the first section 102 and third section 106, and the second unit 112 including the second section 104 and the fourth section 108. The enclosure 101 is illustrated in FIG. 1 as a rectangular prism, or at least a cross-section of a rectangular prism, but in other embodiments the enclosure 101 might be a cube, a sphere, or another three-dimensional shape.

The battery pack 100, in accordance with at least one embodiment, may further include an intake plenum 120 fluidly coupled to the enclosure 101, and located at a first end 114 thereof and extending along the first section 102 and the second section 104. The battery pack 100, in accordance with the embodiment of FIG. 1, may additionally include an exhaust plenum 125 fluidly coupled to the enclosure 101, and located at a second opposing end 116 thereof and extending along the third section 106 and the fourth section 108. The term plenum as used herein, may be used interchangeably with the term manifold, and refers to a space for fluid to travel (e.g., in some cases unobstructed space for fluid to travel). The intake plenum 120 and the exhaust plenum 125 may vary in geometry. For example, the intake plenum 120 or the exhaust plenum 125 may, in one embodiment, be tapered (e.g., as shown by the dotted line in the exhaust plenum 125) and have different sizes. Further, the intake plenum 120 and the enclosure 101 may be separated by a physical barrier 122, so long as the physical barrier 122 includes flow passageways (e.g., holes, slots, louvers, etc.) across at least a portion (or in another embodiment along an entire length) of the physical barrier 122 for fluid to travel from the intake plenum 120 to the enclosure 101. The physical barrier 122 has the additional benefit of supporting the one or more battery cells 160 within the enclosure 101.

The battery pack 100 of FIG. 1 additionally includes an intake port 130 attached to the first section 102 of the enclosure 101. In the illustrated embodiment, the intake port 130 is coupled to the intake plenum 120. In yet another embodiment, the intake port 130 could be coupled directly to the first section 102, as opposed to the intake plenum 120. The intake port 130, in accordance with one embodiment of the disclosure, is coupleable to a source 135 of cooling fluid. The embodiment of FIG. 1 illustrates the intake port 130 coupled to a fan, as the source 135 of cooling fluid.

The battery pack 100 of FIG. 1 additionally includes a first exhaust port 140 attached to the third section 106 of the enclosure 101, and a second exhaust port 150 coupled to the fourth section 108 of the enclosure 101. In the illustrated embodiment, the first exhaust port 140 is coupled to the exhaust plenum 125. In yet another embodiment, the first exhaust port 140 could be coupled directly to the third section 106 of the enclosure 101, as opposed to the exhaust plenum 125. In the illustrated embodiment, the second exhaust port 150 is also coupled to the exhaust plenum 125. In yet another embodiment, the second exhaust port 150 could be coupled directly to the fourth section 108, as opposed to the exhaust plenum 125. The intake port 130 and the first exhaust port 140 create a U-type fluid flow path, wherein as the intake port 130 and the second exhaust port 150 create a Z-type fluid flow path. When both the first exhaust port 140 and the second exhaust port 150 are open, a J-type fluid flow path is created.

In accordance with one or more embodiments, a first control valve 145 may be coupled to the first exhaust port 140. The first control valve 145, in this embodiment is operable to control a first flow of fluid exhausted from the first exhaust port 140. In accordance with one or more embodiments, a second control valve 155 may be coupled to the second exhaust port 150. The second control valve 155, in this embodiment is operable to control a second flow of fluid exhausted from the second exhaust port 150. The first and second control valves 145, 155 in one or more embodiments, are operable to be at least partially open at a same time, and in certain other embodiments are independently controllable to create the U-type fluid flow path, Z-type fluid flow path or J-type fluid flow path.

The battery pack 100 of FIG. 1 additionally includes a plurality of battery cells 160 located within the enclosure, and in the embodiment of FIG. 1 resting on the physical barrier 122. In accordance with one embodiment, a first set of battery cells 160a-160e are located within the enclosure 101 in the first and third sections 102, 106, for example in the first unit 110. One or more first fluid passageways, such as one or more first air passageways 170 in the illustrated embodiment, separate each the first set of battery cells 160a-160e. In accordance with the embodiment of FIG. 1, a second set of battery cells 160f-160j are located within the enclosure 101 in the second and fourth sections 104, 108, for example in the second unit 112. One or more second fluid passageways, such as one or more second air passageways 175 in the illustrated embodiment, separate each the second set of battery cells 160f-160j. While FIG. 1 has illustrated ten battery cells 160 in total in the enclosure 101, other embodiments may exist wherein the first set of battery cells includes two or more battery cells in the first unit 110, and the second set of battery cells includes two or more battery cells in the second unit 112. Accordingly, the present disclosure is not limited to any number of battery cells 160 in the enclosure 101. Further, the one or more first air passageways 170 may vary in size (e.g., width) among themselves, as well as the one or more second air passageways 175 may vary in size (e.g., width) among themselves.

The battery pack 100 of FIG. 1 additionally includes one or more first temperature sensors 180 located proximate the first set of battery cells 16a-160e for sensing a first temperature in the first or third sections 102, 106, and one or more second temperature sensors 185 located proximate the second set of battery cells 160f-160j for sensing a second temperature in the second or fourth sections 104, 108. For exemplary purposes, FIG. 1 illustrates temperature sensor 180b ($T_2$) on battery cell 160b, temperature sensor 180d ($T_4$) on battery cell 160d, temperature sensor 185g ($T_7$) on battery cell 160g and temperature sensor 185i ($T_9$) on battery cell 160i. Temperatures sensed from the first temperature sensors 180 and the second temperature sensors 185 may be used as an input to control (e.g., independently control) the first and second control valves 145, 155.

The air passage widths, and sizes and shapes of the intake plenum 120 and exhaust plenum 125 may be optimized as described in more detail below. For optimization purposes, the air passageways 170, 175 may be grouped. For example, certain of the air passageways 170 are grouped as $x_1$ and $x_2$, and certain of the air passageways 175 are grouped as $x_3$ and $x_4$, respectively.

To help illustrate air flow control, the embodiment of the battery pack 100 is shown with the intake port 130 in the first section 102 (e.g., lower left), the first exhaust port 140 in the third section 106 (e.g., upper left) and the second exhaust port 150 in the fourth section 108 (e.g., upper right). When the first control valve 145 in the first exhaust port 140 is closed, intake cooling fluid will generally take a path primarily through the second unit 112 exhausting through the second exhaust port 150, and thus take a Z-type flow path (referred to as Z-mode). When the second control valve 155 in the second exhaust port 150 is closed, intake cooling fluid will generally take a path primarily through the first unit 110 exhausting through the first exhaust port 140, and thus take a U-type flow path (referred to as U-mode). When the first control valve 145 and the second control valve 155 are both open to some degree (e.g., varying degrees in certain embodiments), the intake cooling fluid will exhaust through both the first exhaust port 140 and the second exhaust port 150 and distribute more even cooling across the battery pack 100, and thus take a J-type flow path (referred to as J-mode). By further controlling the mass flow rate allowed to pass through the first and second control valves 145, 155 (e.g., opening degree in on embodiment), the battery pack 100 can be flexibly controlled and modified according to measured battery pack temperature.

The present disclosure is not limited to the number of battery cells shown, the number and position of air intakes and air exhausts, the geometries of the intake and exhaust plenums or the chosen groupings of air passages for optimization. Rather, FIG. 1 shows an embodiment from which we can illustrate the present disclosure and how it is applied. For example, multiple air exhausts (e.g., more than two) could be incorporated into the battery pack 100 that would conceivably allow for even better uniformity of mass air flow through the battery pack 100. The multiple air exhausts could be used to control air flow to more than just a left or right section, as shown in FIG. 1.

Figure 2:
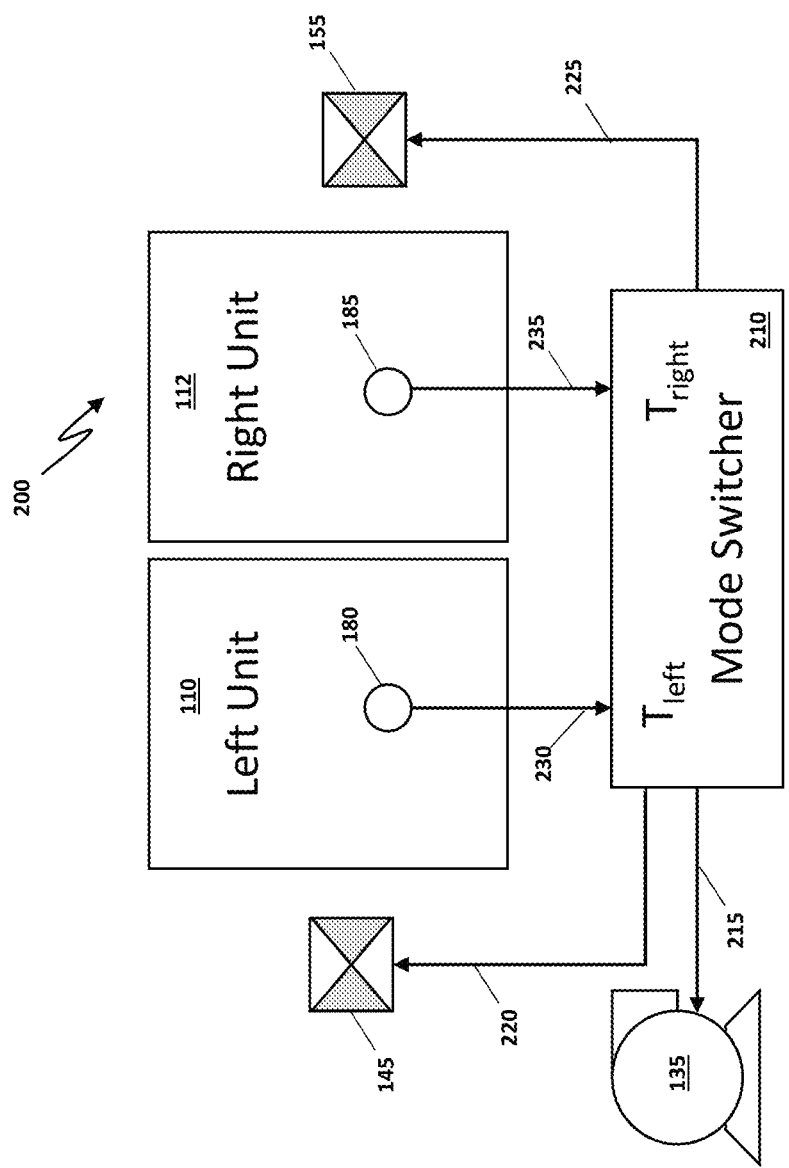
FIG. 2 is a block diagram of a controller system according to an embodiment of the present disclosure.

A battery thermal management system according to the present disclosure may include various control mechanisms for controlling a temperature distribution of a battery pack. An illustrative embodiment of a simple controller system is shown in FIG. 2 as controller system 200, illustrative of a battery thermal management system for the battery pack 100 of FIG. 1. Controller system 200 uses a measured temperature $T_{left}$ of the first unit 110 and a measured temperature $T_{right}$ of second unit 112 to switch operating modes and control battery cell temperature distribution. Mode switcher 210 is a digital controller operatively connected to the first control valve 145 and second control valve 155 via signals 220 and 225, respectively, to open or close the first control valve 145 and second control valve 155 to put the battery thermal management systems in the U-mode, Z-mode or J-mode. Mode switcher 210 is optionally connected to the source 135 of cooling fluid to control the source speed 215 (and mass air flow rate). In some embodiments source 135 may be operated to be only on or off (no speed control), while in other embodiments source 135 may operate continuously without being switched or without a variable speed.

A set of temperature measurements 230 from the first temperature sensors 180 may be averaged to determine a measured temperature $T_{left}$ of the left section, and a set of temperature measurements 235 from the second temperature sensors 185 may be averaged to determine a measured temperature $T_{right}$ of the right section. For example, $T_{left}$ may be calculated $T_{left}=(T_2+T_4)/2$ and $T_{right}=(T_7+T_9)/2$.

Figure 3:
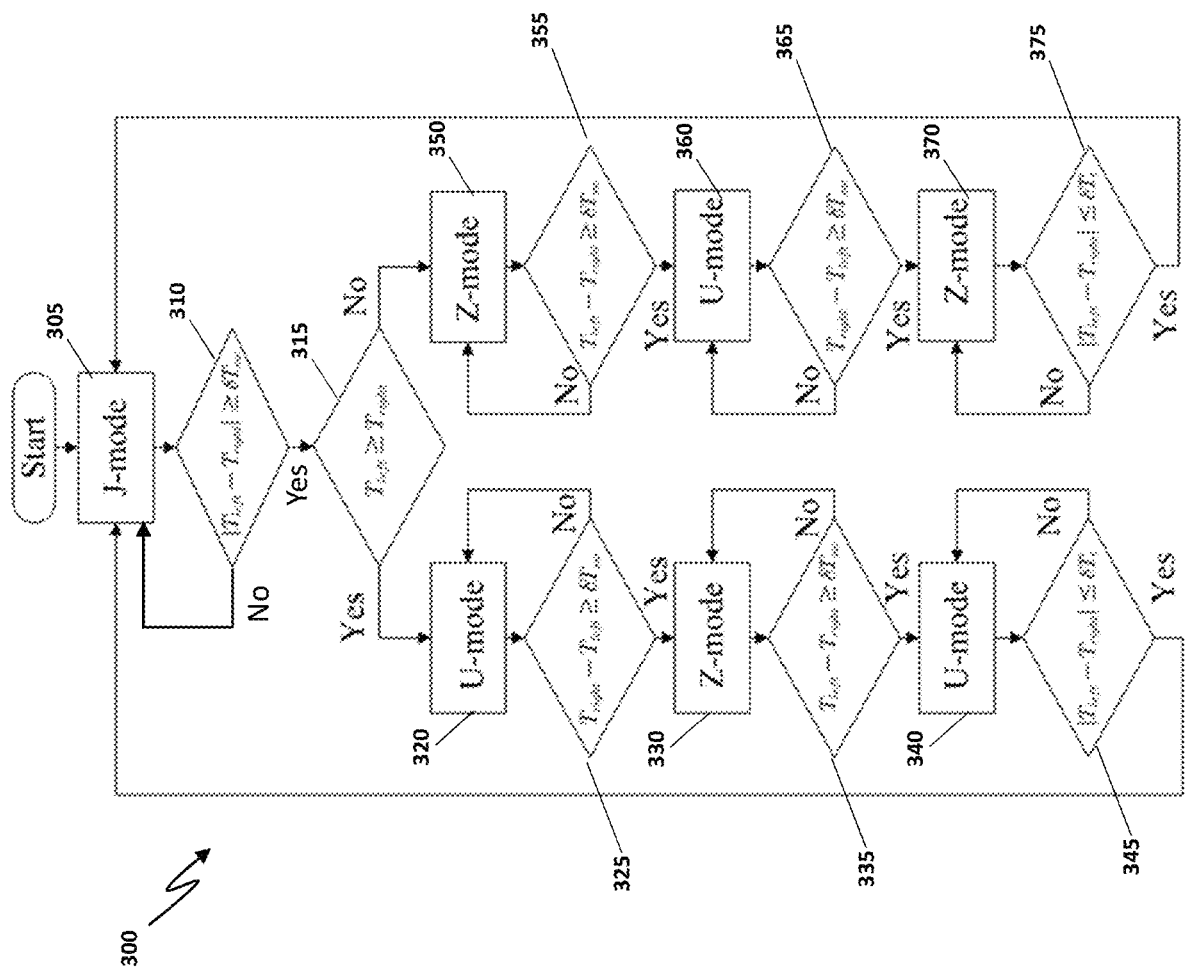
FIG. 3 is a flow diagram of an operational method for a mode switcher according to an embodiment of the present disclosure.

One embodiment of an operational method 300 for mode switcher 210 is shown FIG. 3. According to operational method 300 illustrated in the embodiment of FIG. 3, the mode switcher starts in the J-mode state where, at step 305, the mode switcher opens both control valves. At step 310, if the absolute value of $T_{left}-T_{right}$ is greater than or equal to a first threshold, $\Box T_{SW}$, then the battery pack will be switched to either a U-mode state or a Z-mode state depending on step 315. If, at step 310, the absolute difference $|T_{left}-T_{right}|$ is less than the first threshold, then the battery pack stays in the J-mode.

At step 315, if $T_{left} \geq T_{right}$, then, steps 320 to 345 are performed. At step 320, the battery pack is switched to the U-mode state and stays in that state until, at step 325, the difference $T_{right}-T_{left}$ is greater than the first threshold. When the condition of step 325 is met, then the battery pack is switched to the Z-mode state (step 330) and stays in that state until, at step 335, the difference $T_{left}-T_{right}$ is greater than the first threshold. When the condition of step 335 is met, then the battery pack is switched to the U-mode once again (step 340) where it stays until, at step 345, the absolute difference $|T_{left}-T_{right}|$ is less than or equal to a second threshold, $\cdot T_t$. When the condition of step 345 is met, the operational method 300 repeats beginning with step 305 where the battery pack is switched to the J-mode state and the method continues from there as shown.

At step 315, if $T_{left}<T_{right}$, then, steps 350 to 375 are performed. At step 350, the battery pack is switched to the Z-mode state and stays in that state until, at step 355, the difference $T_{left}-T_{right}$ is greater than the first threshold. When the condition of step 355 is met, then the battery pack is switched to the U-mode state (step 360) and stays in that state until, at step 365, the difference $T_{right}-T_{left}$ is greater than the first threshold. When the condition of step 365 is met, then the battery pack is switched to the U-mode once again (step 370) where it stays until, at step 375, the absolute difference $|T_{left}-T_{right}|$ is less than or equal to a second threshold, $\Box T_t$. When the condition of step 375 is met, the operational method 300 repeats beginning with step 305 where the battery pack is switched to the J-mode state and the method continues from there as shown.

In one embodiment, the first threshold, $\equiv T_{SW}$ is approximately 0.5 K and the second threshold $\Box Tt$ is approximately 0.2 K. Other embodiments of the mode switcher may be conceived according to the present disclosure wherein, for example, the first and second thresholds are different values, fewer or more threshold temperature differentials are needed or wherein the logic is designed to keep the battery thermal management system alternating between U-mode and Z-modes for a longer time than operating in the J-mode. In operational method 300, only three mode switches are performed after the leaving of the J-mode before returning to the J-mode. Nevertheless, more or less than three mode switches are within the scope of the disclosure. Mode switcher 210 may implement operational method 300 and generate the necessary signals to the control valves by most any well-known hardware means known in the art, such as a microcontroller, programmable logic, etc.

Figure 4:
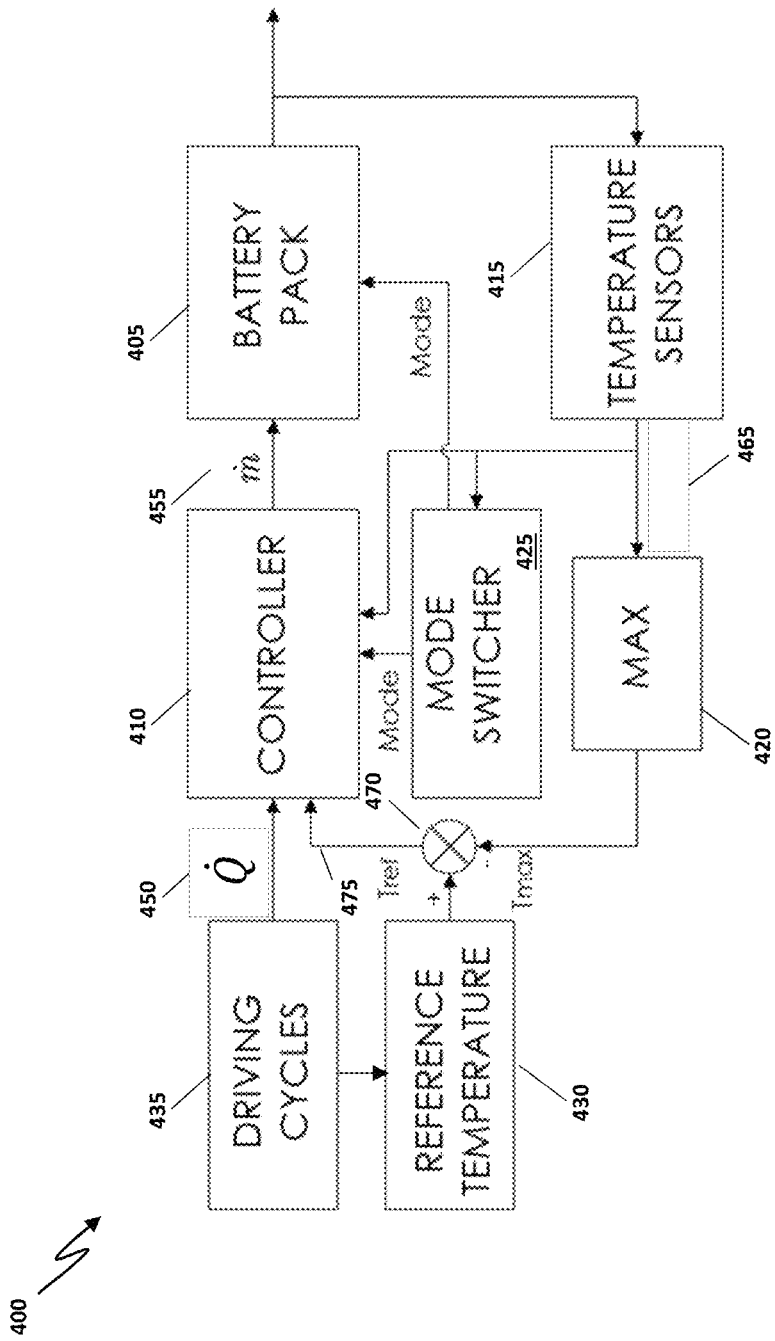
FIG. 4 is a block diagram of a battery thermal management system that employs a generalized controller system according to an embodiment of the present disclosure.

An embodiment of a battery thermal management system 400 is shown in FIG. 4. Battery thermal management system 400 comprises a battery pack 405, a controller system 410 controlling the air mass flow rate into battery pack 405, a mode switcher 425 for controlling exhaust air flow modes (J-mode, U-mode, Z-mode), a driving cycle analyzer 435 and a reference temperature analyzer 430. Battery pack 405 may be configured as described for battery pack 100 of FIG. 1. Battery pack 405 includes a set of temperature sensors 415 generating a set of temperature measurements 465. The battery thermal management systems 400 further comprises a temperature selector 420, which determines the maximum battery cell temperature $T_{max}$ from a set of temperature measurements 465.

Mode switcher 425 may implement mode switching logic as described in FIG. 3. Mode switcher 425 is electronically connected to battery pack 405 to switch the control valves based on the mode switching logic. Driving cycle analyzer 435 analyzes several measured parameters such as vehicle, gradient (vehicle load), start/stop rate and external temperature. Based on an electro-thermal model and a battery electric model, these parameters are further analyzed into three major control variables (battery discharging current, state of charge, and the operating (battery pack) temperature). These control variables are used to calculate real-time heat generation rate, Q(t). In some embodiments, driving cycle analyzer 435 provides controller system 410 with predictive inputs 450 of the heat generation rate and operational temperature for a next time frame (t+Δt). In some embodiments, it is conceived that the driving cycle analyzer 435 analyze real-time and expected driving conditions, forecasted based on the data of real time traffic congestion, road situation (ratio of slope, road condition), and historical record of personal driving habits. This information can transfer directly from a vehicle driving system or other board vehicle computer (e.g. OBD II) to the driving condition analyzer.

Reference temperature analyzer 430 accepts the control variable data such as operational temperature data from the driving cycle analyzer 435 to compute a reference temperature. It may also accept other driving cycle data from driving cycle analyzer related to driving habit, traffic conditions, air temperature and so forth to compute the reference temperature which is an expected (not to exceed) operating temperature for the battery pack. In some embodiments, the reference temperature may be computed as a reference temperature trajectory. In some embodiments the reference temperature is predefined based on the input conditions. In other embodiments the reference temperature and driving cycle parameters are determined from a trained artificial neural network.

A differential amplifier 470 generates a bias signal 475 proportional to a measured temperature bias between the reference temperature and measured maximum battery cell temperature ($T_{max}-T_{ref}$). Bias signal 475 is received by controller system 410 along with predictive inputs 450. Controller system 410 is configured to control mass air flow rate 455 ($\dot{m}$) of cooling air through the battery pack so as to minimize the bias signal. Controller system 410 may be implemented as a proportional-integral-derivative (PID) controller, for example, that only uses bias signal 475. In other embodiments that utilize predictive inputs 450 as well as bias signal 475, controller system 410 may be implemented as a more complex proportional-integral-derivative controller, a trained artificial neural network (ANN) or as a fuzzy logic controller.

Figure 5:
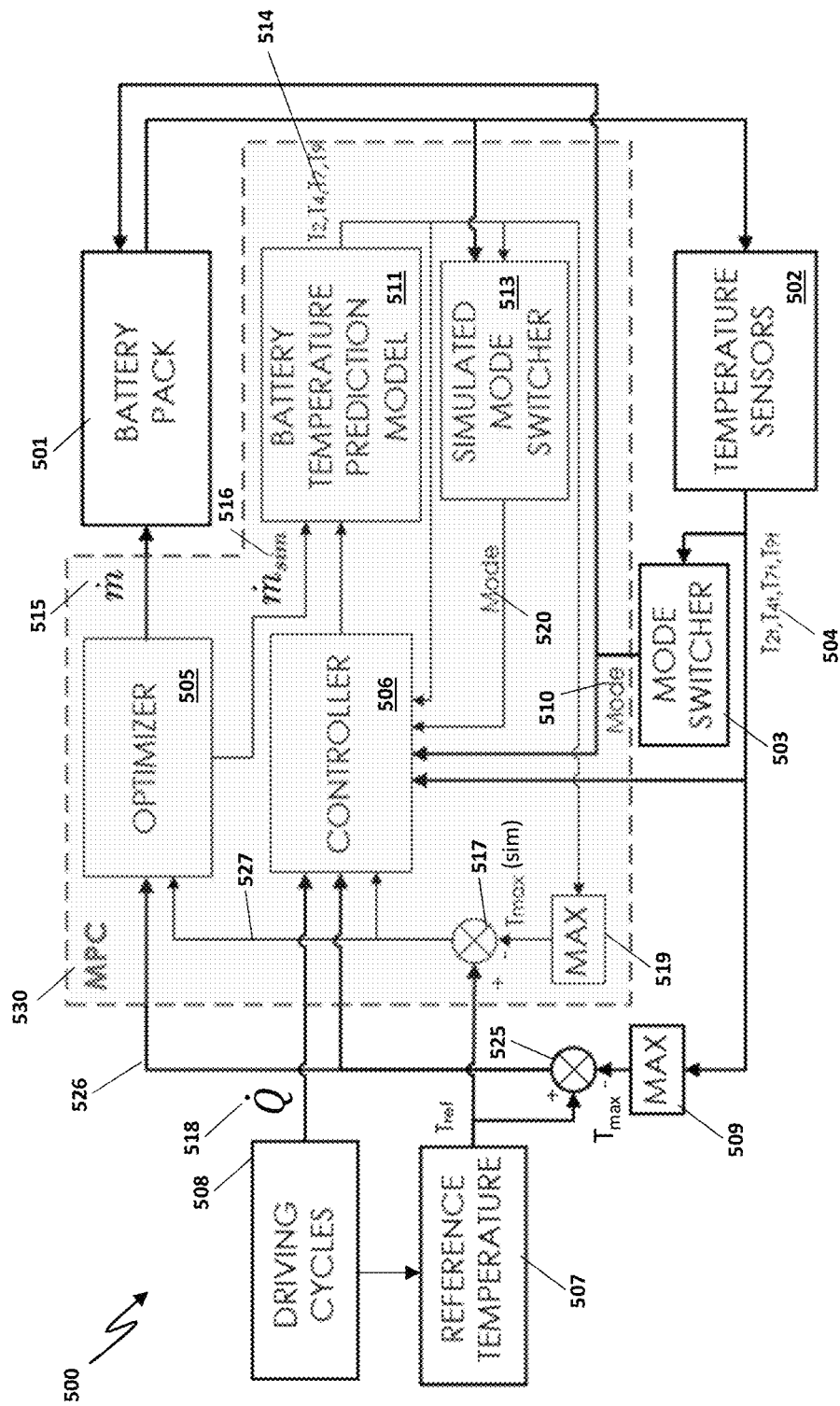
FIG. 5 is a block diagram of a battery thermal management system that employs a model predictive controller system according to an embodiment of the present disclosure.

An embodiment of a model predictive controller (MPC) based battery thermal management system 500 is shown in FIG. 5. MPC-based battery thermal management system 500 comprises a battery pack 501, an MPC-controller 530 controlling the mass air flow rate into battery pack 501, a mode switcher 503 for controlling exhaust air flow mode 510 (J-mode, U-mode, Z-mode), a driving cycle analyzer 508 and a reference temperature analyzer 507. Battery pack 501 may be configured as described for the battery pack 100 of FIG. 1. Battery pack 501 includes set of temperature sensors 502 generating a set of temperature measurements 504. MPC-based battery thermal management system 500 further includes a temperature selector 509, which determines the maximum battery cell temperature $T_{max}$ from set of temperature measurements 504.

Mode switcher 503 may implement mode switching logic as described in FIG. 3. Mode switcher 503 is electronically connected to battery pack 501 to switch the exhaust valves based on the mode switching logic. Driving cycle analyzer 508 analyzes several measured parameters such as vehicle, gradient (vehicle load), start/stop rate and external temperature. Based on an electro-thermal model and a battery electric model, these parameters are further analyzed into three major control variables (battery discharging current, state of charge, and the operating (battery pack) temperature). These control variables are used to calculate real-time heat generation rate, Q(t). In some embodiments, driving cycle analyzer 508 provides MPC-controller 530 with predictive inputs 518 of the heat generation rate and operational temperature for the next few time frames (t+kΔt, for k=1, 2 ... n). In some embodiments, it is conceived that the driving cycle analyzer analyze real-time and expected driving conditions, forecasted based on the data of real time traffic congestion, road situation (ratio of slope, road condition), and historical record of personal driving habits. This information can transfer directly from a vehicle driving system or other board vehicle computer (e.g. OBD II) to the driving condition analyzer.

Reference temperature analyzer 507 accepts the control variable data such as operational temperature data from the driving cycle analyzer to compute a reference temperature trajectory. It may also accept other driving cycle data from driving cycle analyzer related to driving habit, driving location, traffic conditions, air temperature and so forth to compute the reference temperature which is an expected (not to exceed) operating temperature for the battery pack. In some embodiments the reference temperature is predefined based on the input conditions. In other embodiments the reference temperature analyzer and driving cycle analyzer have the capacity of self-learning and self-adaptation, for example, parameters are determined from a trained artificial neural network.

A differential amplifier 525 generates a bias signal 526 proportional to a measured temperature bias between the reference temperature and measured maximum battery cell temperature ($T_{max}-T_{ref}$). MPC-controller 530 receives bias signal 526 along with predictive inputs 518. MPC-controller 530 is configured to control air mass flow rate 515 ($\dot{m}$) of cooling air through the battery pack so as to minimize the bias signal predictively for the next few time frames. MPC-controller 530 comprises an optimizer 505, a battery temperature predictor 511, a simulated mode switcher 513, a simulated controller 506, a simulated temperature selector 519 and a simulated differential amplifier 517. Battery temperature predictor 511 is configured to compute simulated operational temperatures in the set of time frames for the battery cells of the battery pack. The temperature prediction process for the battery temperature predictor is explained more fully below.

Simulated mode switcher 513 accepts as inputs the simulated operational temperatures and the real-time battery pack temperatures and is configured to simulate the behavior of mode switcher 503 based on the inputs. The output of simulated mode switcher 513 is a set of simulated mode states for each of the set of time frames. Temperature selector 519 selects maximum temperature, $T_{max}$ (sim), from the simulated operational temperatures which is combined with reference temperatures for the set of time frames to compute simulated bias signals 527 for the set of time frames.

Simulated controller 506 receives as inputs: measured set of temperature measurements 504, simulated set of temperatures 514, exhaust air-flow mode 510, simulated mode 520, simulated bias signals 527, bias signal 526 and predictive inputs 518. Simulated controller 506 may be configured to simulate a PID controller, for example, that only uses bias signal 526 while in other embodiments simulated controller 506 may utilize the many other inputs to model a complex PID controller, a trained artificial neural network (ANN) or a fuzzy logic controller. The output of simulated controller 506 is a simulated mass flow rate 516.

Optimizer 505 is configured to forecast the operation of the MPC-based battery thermal management systems 500 for the set of time frames and then to determine the appropriate air mass flow rate 515 (fan speed for cooling air) as the control output for the current time. Optimizer 505 receives simulated bias signals 527, which are the differences ($T_{refk}-T_{xk}$) for the xth battery cell for the kth time frame step ahead of the current time (from simulated differential amplifier 517) and for the current time (from differential amplifier 525). Optimizer 505 optimizes the mass air flow rate based on a cost function J, such as:

$$J = \alpha \sum_{k=n}^{n+4} [(T_{refk} - T_{2k})^2 + (T_{refk} - T_{4k})^2 + (T_{refk} - T_{7k})^2 + (T_{refk} - T_{2k})^2] + \beta \sum_{k=2}^{n+3} (\Delta M_{rate})^2$$

where k is an index to the kth time step ahead and $T_{2k}$, $T_{4k}$, etc. are predicted battery cell temperatures from the battery temperature predictor. $\Delta M_{rate}$ is a predicted requirement for change in mass flow rate in the next few time steps k. The cost function J consists of two parts: the first part is the battery cell temperature differences, and the second part is the change rate of the mass flow rate to the battery pack.

The MPC strategy is a further improvement compared with the control system that only without the MPC controller. The MPC system does consider the changes between battery maximum temperature and the reference temperature, and the changing ratio of mass flow rate, in which it yields a more smoothing mass flow rate curve.

Figure 6:
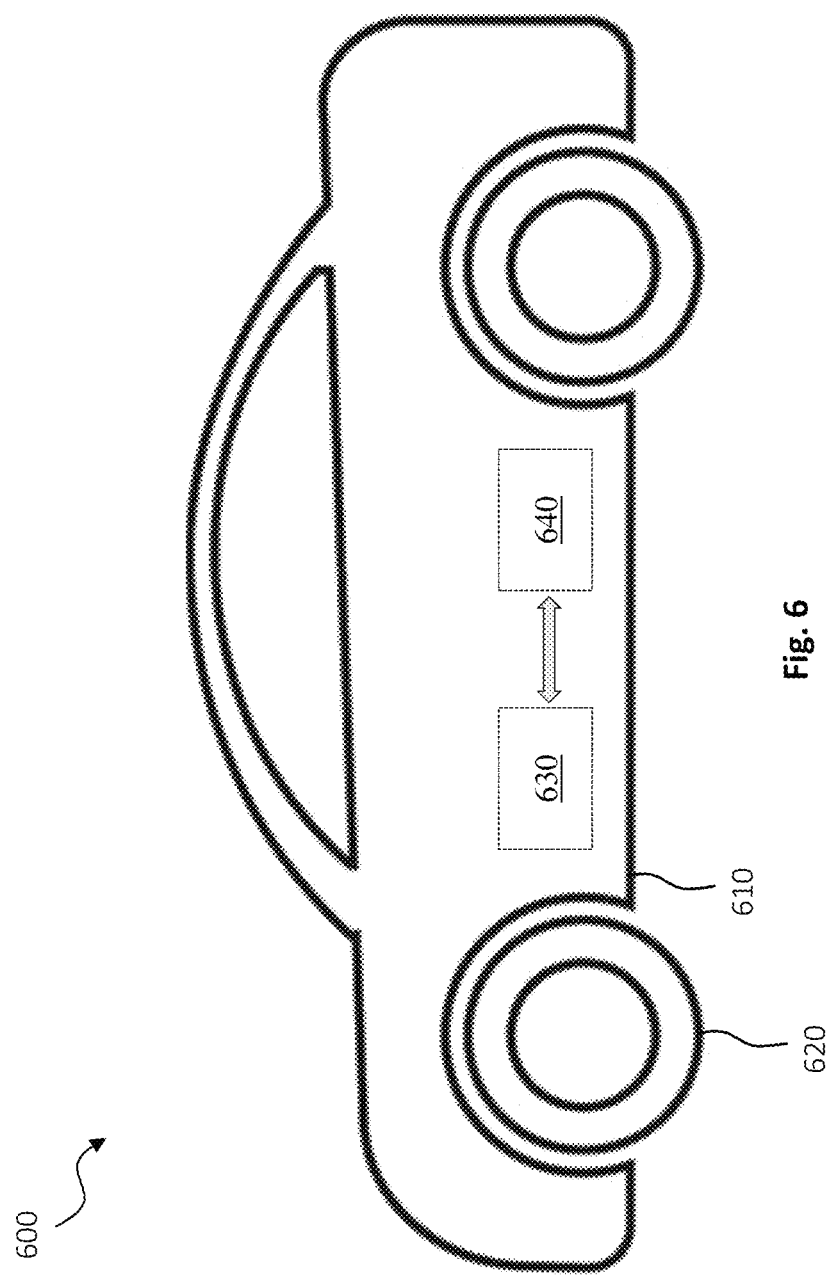
FIG. 6 is an electric vehicle that employs a battery pack and/or battery thermal management system according to the disclosure.

An embodiment of an electric vehicle 600 is shown in FIG. 6. The electric vehicle 600, in at least one embodiment, includes a chassis 610, wheels 620 coupled to the chassis 610. The electric vehicle 600, in the embodiment illustrated in FIG. 6, additionally includes an electric motor 630 coupled to the chassis 610, as well as a battery thermal management system 640 electrically coupled to the electric motor 630. The battery thermal management system 640, in one embodiment, is similar to one or more of the battery thermal management systems discussed above.

Aspects disclosed herein include:

A. A battery pack, the battery pack including: 1) an enclosure, the enclosure separated into first, second, third and fourth sections, the first section being adjacent to each of the second and third sections and diagonally opposite the fourth section, and the third section being adjacent to each of the first and fourth sections and diagonally opposite the second section; 2) an intake port attached to the first section of the enclosure, the intake port coupleable to a source of cooling fluid; 3) a first exhaust port attached to the third section of the enclosure and a second exhaust port coupled to the fourth section of the enclosure; 4) a first set of battery cells located within the enclosure in the first and third sections, the first set of battery cells separated by one or more first fluid passageways; and 5) a second set of battery cells located within the enclosure in the second and fourth sections, the second set of battery cells separated by one or more second fluid passageways.

B. A battery thermal management system, the battery thermal management system including: 1) a battery pack, the battery pack including; a) an enclosure, the enclosure separated into first, second, third and fourth sections, the first section being adjacent to each of the second and third sections and diagonally opposite the fourth section, and the third section being adjacent to each of the first and fourth sections and diagonally opposite the second section; b) a first exhaust port attached to the third section of the enclosure and a second exhaust port coupled to the fourth section of the enclosure; c) a first control valve coupled to the first exhaust port and operable to control a first flow of fluid exhausted from the first exhaust port, and second control valve coupled to the second exhaust port and operable to control a second flow of fluid exhausted from the second exhaust port; d) a first set of battery cells located within the enclosure in the first and third sections, the first set of battery cells separated by one or more first fluid passageways; and e) a second set of battery cells located in the second and fourth sections, the second set of battery cells separated by one or more second fluid passageways; f) one or more first temperature sensors located proximate the first set of battery cells for sensing a first temperature in the first or third sections, and one or more second temperature sensors located proximate the second set of battery cells for sensing a second temperature in the second or fourth sections; and 2) a controller system configured to independently control the first control valve and the second control valve based on a difference between the first temperature and the second temperature.

C. An electric vehicle, the electric vehicle including: 1) a chassis; 2) wheels coupled to the chassis; 3) an electric motor coupled to the chassis; and 4) a battery thermal management system electrically coupled to the electric motor, the battery thermal management system including; a) a battery pack, the battery pack including; i) an enclosure, the enclosure separated into first, second, third and fourth sections, the first section being adjacent to each of the second and third sections and diagonally opposite the fourth section, and the third section being adjacent to each of the first and fourth sections and diagonally opposite the second section; ii) an intake port attached to the first section of the enclosure, the intake port coupleable to a source of cooling fluid; iii) a first exhaust port attached to the third section of the enclosure and a second exhaust port coupled to the fourth section of the enclosure; iv) a first control valve coupled to the first exhaust port and operable to control a first flow of fluid exhausted from the first exhaust port, and second control valve coupled to the second exhaust port and operable to control a second flow of fluid exhausted from the second exhaust port; v) a first set of battery cells located in the first and third sections, the first set of battery cells separated by one or more first fluid passageways; vi) a second set of battery cells located in the second and fourth sections, the second set of battery cells separated by one or more second fluid passageways; and vii) one or more first temperature sensors located proximate the first set of battery cells for sensing a first temperature in the first or third sections, and one or more second temperature sensors located proximate the second set of battery cells for sensing a second temperature in the second or fourth sections; and b) a controller system configured to independently control the first control valve and the second control valve based on a difference between the first temperature and the second temperature.

Aspects A, B, and C may have one or more of the following additional elements in combination: Element 1: further including a first control valve coupled to the first exhaust port and operable to control a first flow of fluid exhausted from the first exhaust port, and a second control valve coupled to the second exhaust port and operable to control a second flow of fluid exhausted from the second exhaust port. Element 2: wherein the first control valve and the second control valve are operable to be at least partially open at a same time. Element 3: further including one or more first temperature sensors located proximate the first set of battery cells for sensing a first temperature in the first or third sections, and one or more second temperature sensors located proximate the second set of battery cells for sensing a second temperature in the second or fourth sections, the first and second control valves independently controllable based upon the first and second temperatures sensed. Element 4: wherein the enclosure further includes an intake plenum located at a first end thereof and extending along the first section and the second section, and an exhaust plenum located at a second opposing end thereof and extending along the third section and the fourth section, the first set of battery cells located within the enclosure between the intake plenum and the exhaust plenum in the first and third sections, and the second set of battery cells located within the enclosure between the intake plenum and the exhaust plenum in the second and fourth sections. Element 5: wherein the intake port is coupled to the intake plenum in the first section, the first exhaust port is coupled to the exhaust plenum in the third section, and the second exhaust port is coupled to the exhaust plenum in the fourth section. Element 6: wherein the intake port is coupled to a fan as the source of the cooling fluid. Element 7: wherein the one or more first fluid passageways vary in size and the one or more second fluid passageways vary in size. Element 8: wherein the first section is a first lower section, the second section is a second lower section, the third section is a first upper section and the fourth section is a second upper section. Element 9: wherein a fluid flow path between the intake port and the first exhaust port is a U-type flow path and a fluid flow path between the intake port and the second exhaust port is a Z-type flow path. Element 10: wherein the controller system is further configured to control a mass flow rate of the cooling fluid. Element 11: wherein the controller system comprises at least one of a proportional-integral-derivative (PID) controller, a fuzzy logic controller, a model predictive controller and a self-learning controller. Element 12: wherein the controller system is configured to implement the steps of: a) comparing the first temperature to the second temperature; b) if the first temperature is greater than or equal to the second temperature by more than a first threshold temperature, then at least partially close the second exhaust port; c) if the second temperature is greater than the first temperature by more than the first threshold temperature, then at least partially close the first exhaust port; and d) if the absolute value of the difference between the first temperature and the second temperature is less than a second threshold, at least partially open the first and second exhaust ports. Element 13: further including a reference temperature analyzer that determines a reference temperature and wherein the controller system is configured to determine the mass flow rate based on a difference between the reference temperature and a measured battery temperature derived from at least one of the first temperature and the second temperature. Element 14: further including a driving cycle analyzer that determines a set of operational parameters from measured driving cycles and wherein the controller system is configured to determine the mass flow rate based on the set of operational parameters. Element 15: wherein the set of operational parameters includes a predicted heat generation rate for the battery pack. Element 16: wherein the enclosure further includes an intake plenum located at a first end thereof and extending along the first section and the second section, and an exhaust plenum located at a second opposing end thereof and extending along the third section and the fourth section, the first set of battery cells located within the enclosure between the intake plenum and the exhaust plenum in the first and third sections, and the second set of battery cells located within the enclosure between the intake plenum and the exhaust plenum in the second and fourth sections, and further wherein the intake port is coupled to the intake plenum in the first section, the first exhaust port is coupled to the exhaust plenum in the third section, and the second exhaust port is coupled to the exhaust plenum in the fourth section, and further wherein an flow path between the intake port and the first exhaust port is a U-type flow path and an flow path between the intake port and the second exhaust port is a Z-type flow path. Element 17: wherein the enclosure further includes an intake plenum located at a first end thereof and extending along the first section and the second section, and an exhaust plenum located at a second opposing end thereof and extending along the third section and the fourth section, the first set of battery cells located within the enclosure between the intake plenum and the exhaust plenum in the first and third sections, and the second set of battery cells located within the enclosure between the intake plenum and the exhaust plenum in the second and fourth sections, and further wherein the intake port is coupled to the intake plenum in the first section, the first exhaust port is coupled to the exhaust plenum in the third section, and the second exhaust port is coupled to the exhaust plenum in the fourth section, and further wherein a fluid flow path between the intake port and the first exhaust port is a U-type flow path and an flow path between the intake port and the second exhaust port is a Z-type flow path.

Further additions, deletions, substitutions and modifications may be made to the described embodiments.

What is claimed is:

1. A battery pack, comprising:
   an enclosure, the enclosure separated into first, second, third and fourth sections, the first section being adjacent to each of the second and third sections and diagonally opposite the fourth section, and the third section being adjacent to each of the first and fourth sections and diagonally opposite the second section;
   an intake port attached to the first section of the enclosure, the intake port coupleable to a source of cooling fluid;
   a first exhaust port attached to the third section of the enclosure and a second exhaust port coupled to the fourth section of the enclosure;
   a first set of battery cells located within the enclosure in the first and third sections, the first set of battery cells separated by one or more first fluid passageways; and
   a second set of battery cells located within the enclosure in the second and fourth sections, the second set of battery cells separated by one or more second fluid passageways; and
   a first control valve coupled to the first exhaust port and operable to control a first flow of fluid exhausted from the first exhaust port, and a second control valve coupled to the second exhaust port and operable to control a second flow of fluid exhausted from the second exhaust port, the first and second control valves operable to move between open and closed to adjust a flow path of the cooling fluid through the enclosure.

2. The battery pack as recited in claim 1, wherein the first control valve and the second control valve are operable to be at least partially open at a same time.

3. The battery pack as recited in claim 1, further including one or more first temperature sensors located proximate the first set of battery cells for sensing a first temperature in the first or third sections, and one or more second temperature sensors located proximate the second set of battery cells for sensing a second temperature in the second or fourth sections, the first and second control valves independently controllable based upon the first and second temperatures.

4. The battery pack as recited in claim 1, wherein the enclosure further includes an intake plenum located at a first end thereof and extending along the first section and the second section, and an exhaust plenum located at a second opposing end thereof and extending along the third section and the fourth section, the first set of battery cells located within the enclosure between the intake plenum and the exhaust plenum in the first and third sections, and the second set of battery cells located within the enclosure between the intake plenum and the exhaust plenum in the second and fourth sections.

5. The battery pack as recited in claim 4, wherein the intake port is coupled to the intake plenum in the first section, the first exhaust port is coupled to the exhaust plenum in the third section, and the second exhaust port is coupled to the exhaust plenum in the fourth section.

6. The battery pack as recited in claim 1, wherein the intake port is coupled to a fan as the source of cooling fluid.

7. The battery pack as recited in claim 1, wherein the one or more first fluid passageways vary in size and the one or more second fluid passageways vary in size.

8. The battery pack as recited in claim 1, wherein the first section is a first lower section, the second section is a second lower section, the third section is a first upper section and the fourth section is a second upper section.

9. The battery pack as recited in claim 1, wherein a fluid flow path between the intake port and the first exhaust port is a U-type fluid flow path and a fluid flow path between the intake port and the second exhaust port is a Z-type fluid flow path.

* * * * *

UNITED STATES PATENT AND TRADEMARK OFFICE
CERTIFICATE OF CORRECTION

PATENT NO. : 11,850,970 B2
APPLICATION NO. : 16/996475
DATED : December 26, 2023
INVENTOR(S) : Jie Zhang and Yuanzhi Liu It is certified that error appears in the above-identified patent and that said Letters Patent is hereby corrected as shown below:

In the Specification

In Column 5, Line 32, after --battery cells-- delete "16a-160e" and insert --160a-160e--

Signed and Sealed this
Fourteenth Day of May, 2024

Katherine Kelly Vidal
*Director of the United States Patent and Trademark Office*